D. R. KNAPP.
INDICATING AND PROTECTIVE DEVICE.
APPLICATION FILED MAY 12, 1910.
1,023,943.
Patented Apr. 23, 1912.
5 SHEETS—SHEET 1.
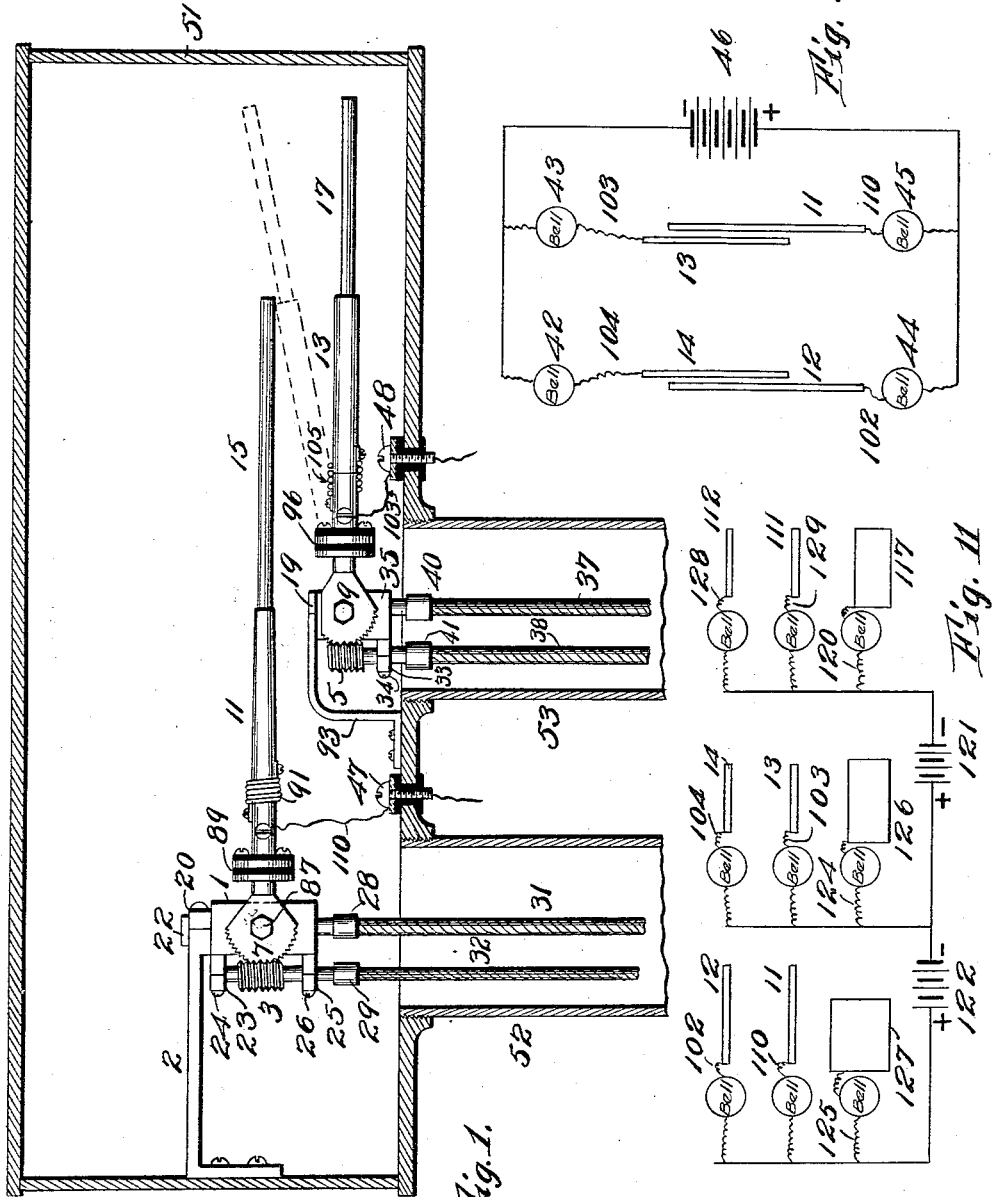
WITNESSES
R. C. Braddock
Emory L. Groff
INVENTOR
DAVID R. KNAPP
By his Attorney

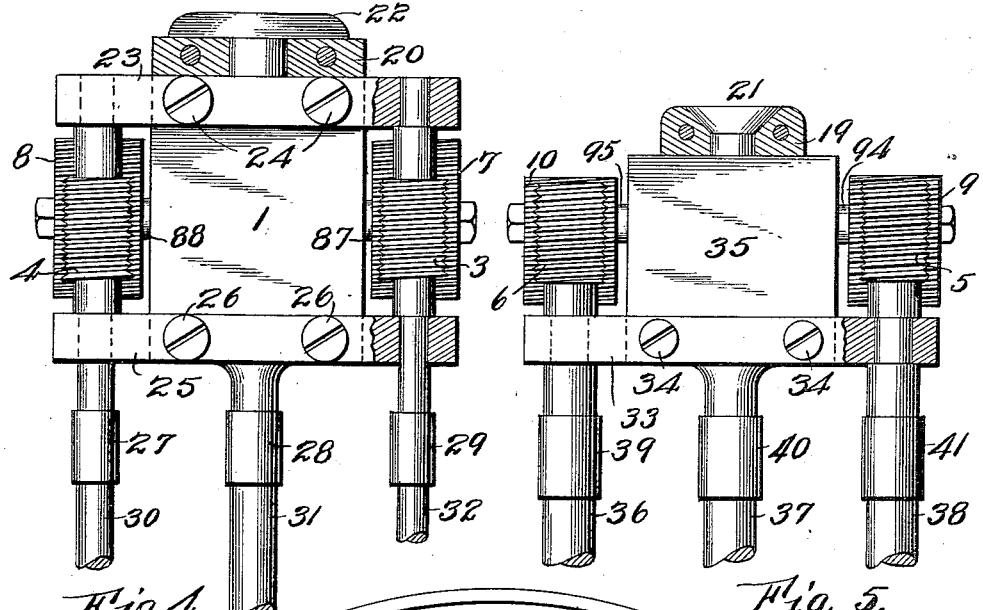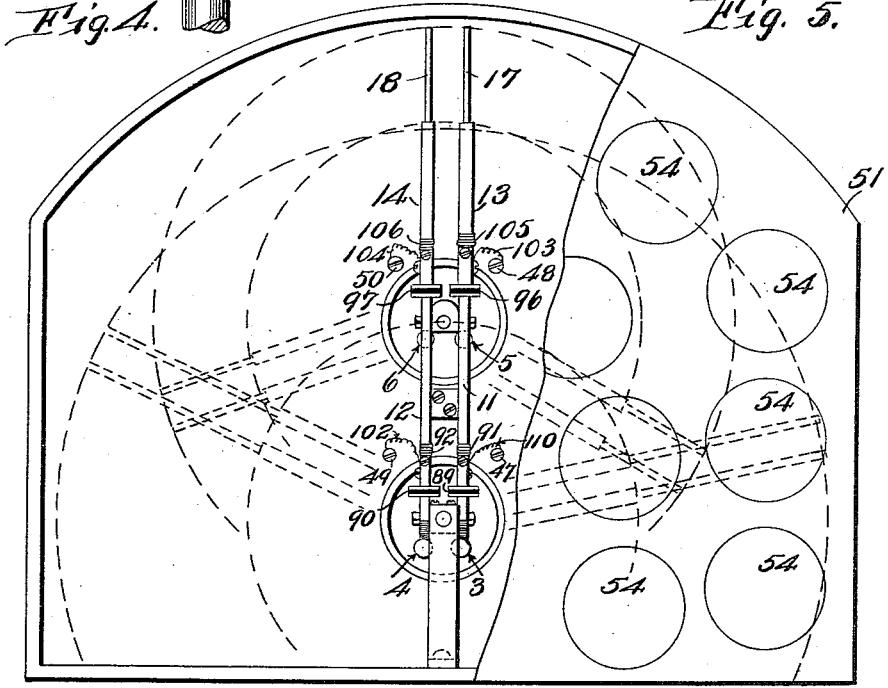

D. R. KNAPP.
INDICATING AND PROTECTIVE DEVICE.
APPLICATION FILED MAY 12, 1910.
1,023,943.
Patented Apr. 23, 1912.
5 SHEETS—SHEET 3.
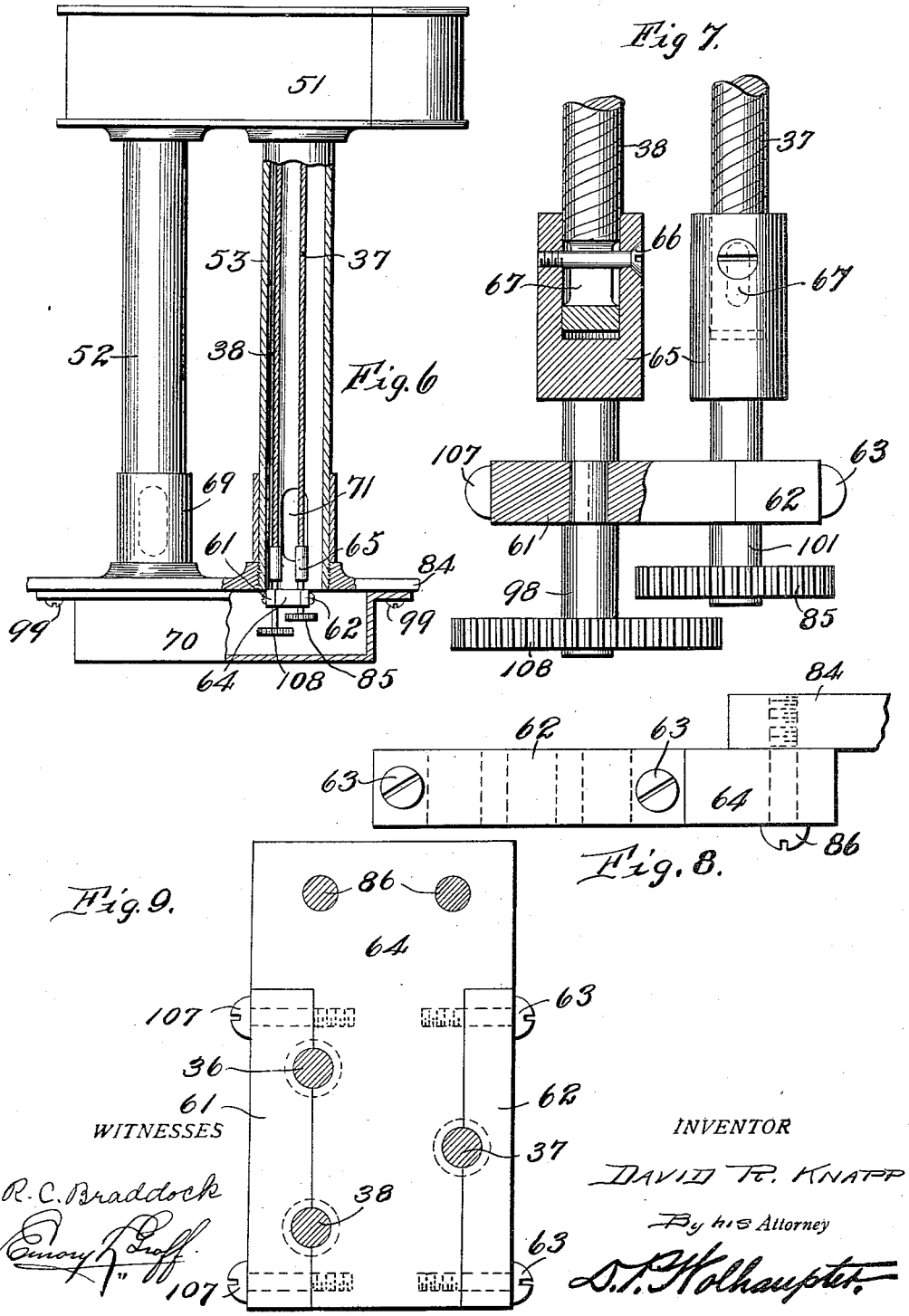

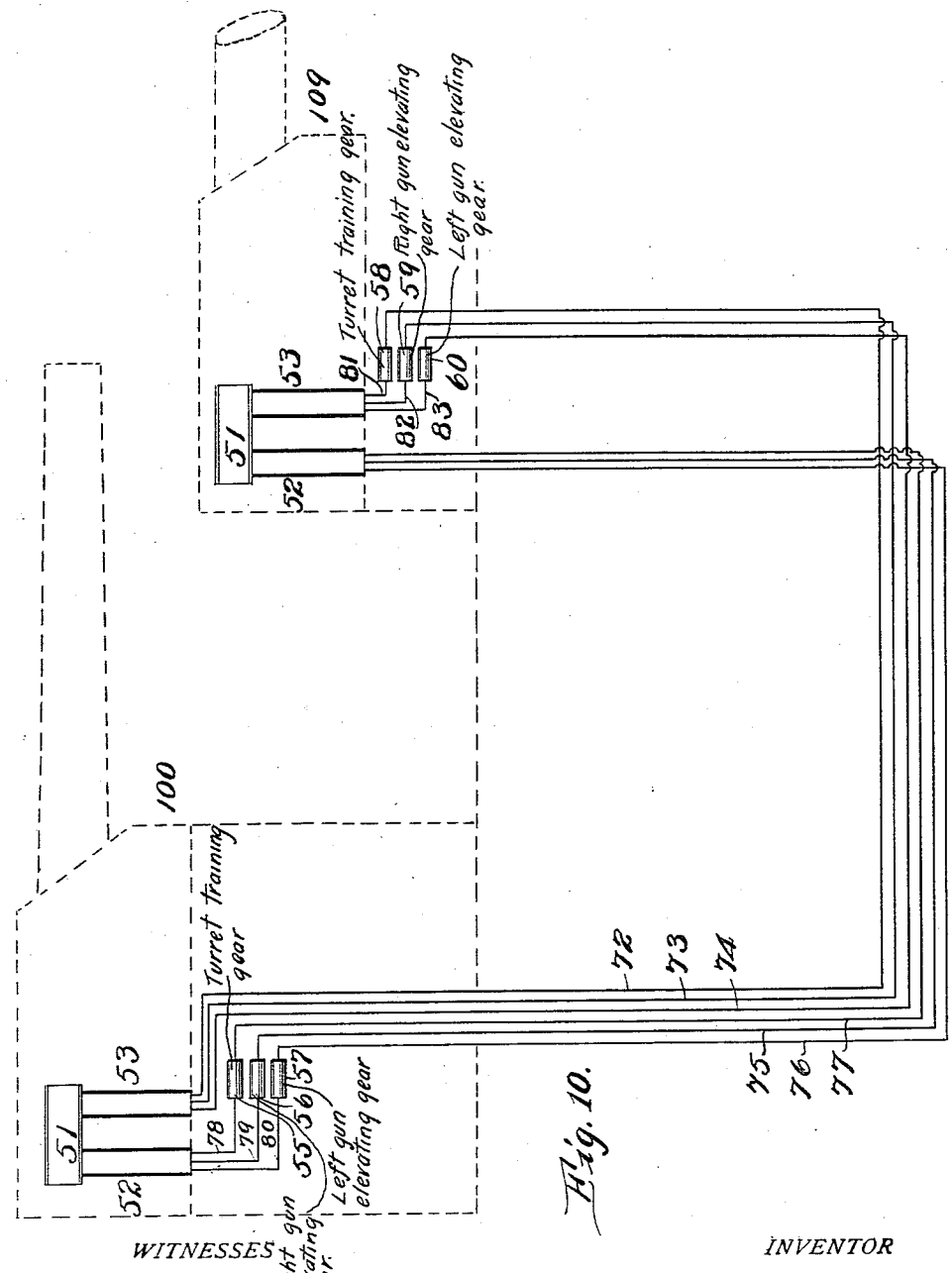

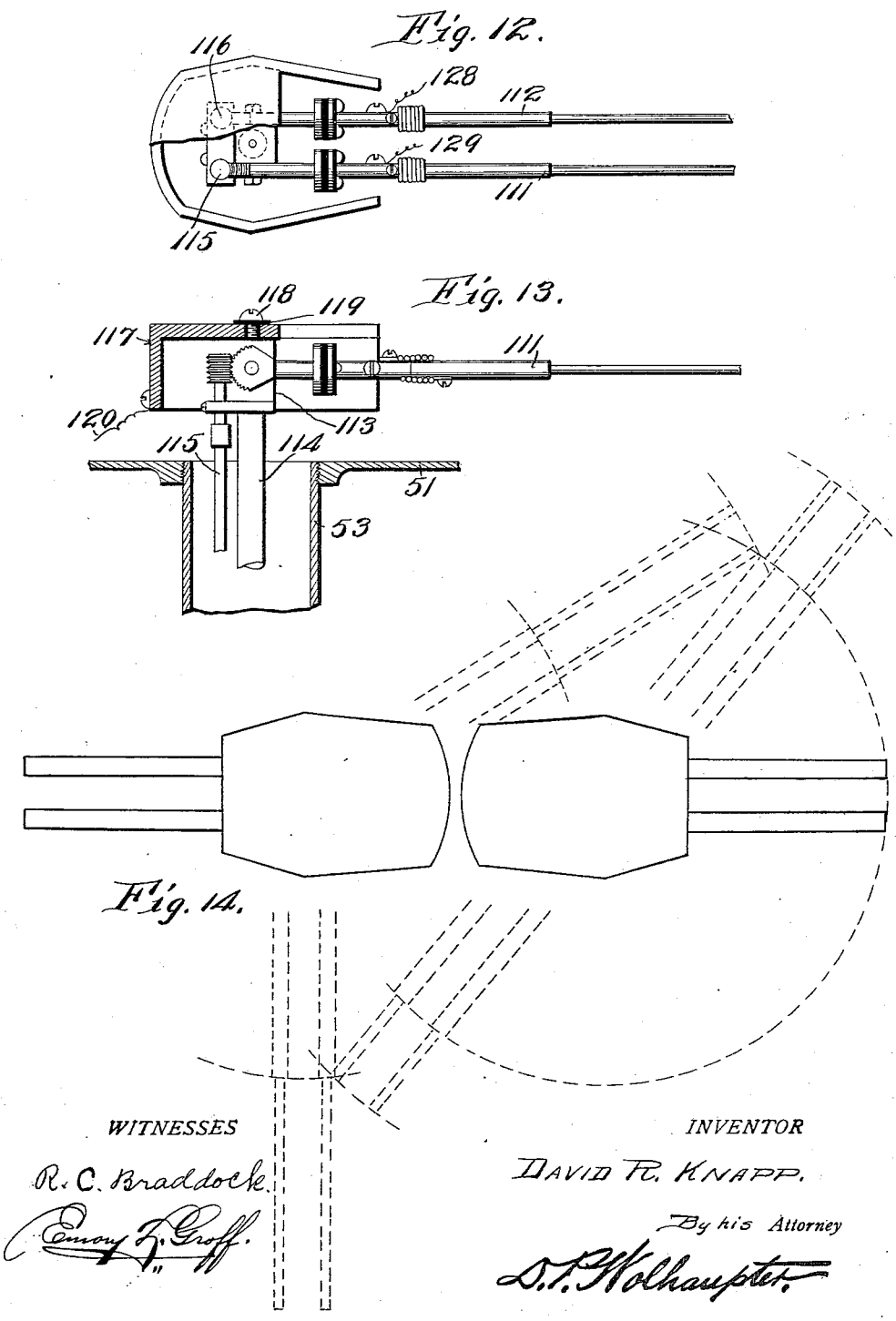

UNITED STATES PATENT OFFICE.

DAVID R. KNAPP, OF PHILADELPHIA, PENNSYLVANIA.

INDICATING AND PROTECTIVE DEVICE.

1,023,943. Specification of Letters Patent. Patented Apr. 23, 1912.

Original application filed December 29, 1908, Serial No. 469,896. Divided and this application filed May 12, 1910. Serial No. 561,003.

*To all whom it may concern:*

Be it known that I, DAVID R. KNAPP, a citizen of the United States, residing at Philadelphia, in the county of Philadelphia and State of Pennsylvania, have invented certain new and useful Improvements in Indicating and Protective Devices, of which the following is a specification.

This invention relates to an indicating and protective device designed particularly for use in connection with gun turrets on war vessels, but capable of application to fortress guns and the like.

To this end the invention has in view the provision of practical and reliable means for indicating the train and elevation of one or more guns, and also improved means to automatically close a supplementary electrical indicating circuit upon the fouling of any guns or turrets or guns and gun-fire. In the latter phase of the invention the present case is a division of the parent application filed December 29, 1908, Serial Number 469,896.

With these objects in view, my invention consists in certain novel features of construction and arrangement of parts, as will hereinafter more fully be described and pointed out in the claims, reference being had to the accompanying drawings forming part thereof, and in which—

Figure 1 is a view partly in section and partly in elevation of the principal part of the device. Fig. 2 is a wiring diagram of the electric circuits attached thereto. Fig. 3 is a plan of the device showing the location of the various parts. Figs. 4 and 5 are end elevation views of the movable members showing more details thereof. Fig. 6 is a side elevation of the device, showing principally the method of supporting, and also the manner in which the various motions are transmitted to, the device. Figs. 7, 8 and 9 are detail views showing the method of supporting the lower gearing. Fig. 10 is a diagrammatic view of the general run of the transmission shafting. Fig. 11 is a wiring diagram where a plurality of turrets are involved. Figs. 12 and 13 are, respectively, a plan and a sectional elevation of a structure embodying features where turret structures are liable to foul or interfere; and Fig. 14 is a plan of a possible arrangement of an additional turret to the lower one as shown in Fig. 10.

This invention, as the accompanying drawings disclose, shows the apparatus as applied to turrets on war vessels.

In some war vessels a plurality of turrets are located on the center line of the vessel, the distance from center to center of turret being determined by the structural condition of the particular vessel, and that each turret consists of a properly armored revolving member in which are mounted two independently operated guns. I may also state that the training motion, which is the revolving motion of the turret, is operated by an electric motor or other means, and that the elevating motion of each gun is operated by electric motors or other prime movers independent of the training motion and independent of each other, and that these motors or prime movers are fixed in the turret and revolve therewith. Inasmuch as these turrets are mounted on the center line of the vessel, in order to obtain the maximum efficiency of gun-fire it is obvious that the guns of one turret will necessarily be mounted at a higher plane than the other, as shown in Fig. 10. The guns as shown in Fig. 10 are shown for two turrets, and the guns may fire at any degree of their train, which is approximately 135° on either side of the center line, or a total of 270°. I may also state that the guns may elevate 15° from a horizontal plane and may depress 5°, or a total range of deflection of 20°.

If two turrets lying in the same plane as shown in Fig. 13 should occupy the general position of the turret designated by the reference number 109 in Fig. 9 of the drawings, there is created a possibility of one firing directly at the turret 100 as it passes across the center line, it being understood that the distance between the turret 100 and the adjacent turret would be sufficient to allow the guns to train on either side of the center line.

It is obvious that from the foregoing description of the location and general construction of these turrets there is great danger, upon the training and elevating, of the guns of one turret fouling with the guns of another, as shown in Fig. 3, and also great danger of the gun-fire from the guns of one turret fouling with the guns of another, as shown in Figs. 1 and 3, and of the turrets themselves fouling, and of the guns of one turret firing directly at the adjacent turret. In times of peace and during target practice it may be feasible to dispense with the use of one or more turrets and place them in a position where they are out of the way; but in warfare this would seriously affect the efficiency of gun-fire of a vessel. These conditions are mostly due to the structural conditions and arrangements of the turrets, they being entirely closed, which prevents an exterior view being had from within. The sighting is done, telescopically, by improved methods, which also does not permit of an exterior view being had in proximity of the turrets.

My invention, therefore, consists in a device located in each turret (so as to be under observation of the turret officer) that will indicate the true relation of the turrets and their guns, and also provide means to close electric circuits or operate warning signals upon any of the aforesaid dangers presenting themselves. A device of this character will increase the efficiency of the vessel, due to the fact that the turret officer may at all times be cognizant as to the relative positions of the turrets, and thereby handle the operation of the same with celerity and accuracy and prevent a condition of self-destruction.

Referring to the figures of the drawings, in which similar numerals refer to like parts throughout the several views, 1 designates a member provided with the shoulder 22; 2 designates a bracket or support provided with the removable cap 20, which is adapted to embrace the said rounded portion of the member 1, and thereby enables said member to turn freely in a horizontal plane on the support 2; 87 and 88 designate shafts in fixed relation to the member 1 and upon which are made to revolve the sectors of the worm wheels 7 and 8.

3 and 4 designate worms in fixed relation with the shafts 32 and 30, being provided with bearings 23 and 25, which are removably attached to the member 1 by the securing screws 24 and 26. Mounted on the sectors 7 and 8 are the elongated members 11 and 12, which are made of some conducting material, but electrically insulated from said sectors by the insulation 89 and 90. The diameters of said elongated members 11 and 12 are proportioned to the diameter of the turret guns, while the length from the center of the member 1 is proportional to the length of the guns; also, the distances between the centers of the elongated members are proportional to the centers of the guns in the turrets.

15 designates a portion of member 11, and its diameter is proportioned to the diameter of the shot fired from said gun, while the length thereof is predetermined, as will be hereinafter described.

91 and 92 designate close wound spiral springs which fit snugly over the elongated members 11 and 12, and said members are parted therein, each terminal of the spring being secured in a suitable manner to the separate parts. If said elongated members engage with any obstruction the spring will readily yield and prevent possible bending, and upon the obstruction being removed the members will assume their normal positions.

35 designates a member provided with the frusto-conical shaped shoulder 21, and 93 designates a fixed support provided with the removable cap 19, which is adapted to embrace the said frusto-conical shaped shoulder. The member 35 is therefore free to revolve in a horizontal plane and it is supported by the support 93.

94 and 95 designate shafts which are rigidly attached to the member 35, and upon which are made to revolve the sectors or worm wheels 9 and 10.

5 and 6 designate worm wheels in engagement with said sectors, and are free to revolve in the bearing 33, which is removably secured to the member 35 by the screws 34. Fixed to each of said sectors 9 and 10 are the elongated members 13 and 14, made of some conducting material, and whose diameter is proportioned to the diameter of the guns and whose length from the center of the sector is proportioned to the distance of the muzzle of the guns from the center of the turrets. The members 13 and 14 are provided with the reduced portions 17 and 18, the diameter thereof being proportioned to the gun bore or the shot fired therefrom, and its length being predetermined, as will be hereinafter described. Attached to the members 13 and 14 are the spiral close wound springs 105 and 106, which fit snugly over the said members and which are separated therein and attached to each terminal of said spring. This gives flexibility to the elongated members 13 and 14 for the purpose as heretofore stated for members 11 and 12. The members 13 and 14 are insulated from the member 35 by the insulation 96 and 97.

37 designates a flexible shaft rigidly attached to the member 35 by the coupling 40.

36 and 38 designate flexible shafts which are rigidly attached to the shafts of the worms 5 and 6 by the couplings 39 and 41.

31 designates a flexible shaft rigidly attached to the member 1 by the coupling 28.

30 and 32 designate flexible shafts rigidly attached to their respective worm shafts by the couplings 27 and 29.

84 designates a plate or foundation found in the rear of the turret and upon which the apparatus is secured by the pipe standards 52 and 53.

51 designates a suitable casing inclosing the apparatus, the base being adapted to be secured to the standards 52 and 53 by threaded engagement. The centers of the standards 52 and 53 are concentric with the centers of the members 1 and 35. The lower parts of said standards have the slot 71 therein, which enables ready inspection and repair to the apparatus at this point inside the standards.

69 designates sleeves adapted to slide over the standards 52 and 53, and serve for a closure of said slots 71.

The vertical centers between the members 1 and 35 are proportioned to the vertical centers of the turrets, while the horizontal centers are proportional to the horizontal centers of the guns. It is obvious, then, that the relative positions of the members 1 and 35 are identical with the relative positions of the turrets. The end of each of the shafts 36, 37 and 38 is provided with a slot 67, which is adapted to engage with the pin 66 in the coupling 65.

64 designates a bearing removably secured to the plate 84 by the screws 86.

61 and 62 designate bearing caps removably secured to the bearing 64 by the screws 107 and 63.

85 designates a gear wheel fixed to the shaft 101, and which is adapted to revolve in the bearing 64 and terminates in the coupling 65. It is obvious that the shaft 37, being fixed to the center of revolution of the member 35, can be made solid if so desired, as shown in Fig. 13.

108 designates a gear wheel in rigid relation with the solid shaft 98, and which is adapted to revolve in the bearing 64 and terminates in the coupling 65. A similar arrangement is provided for the shaft 36. It is obvious that upon the revolving of the member 35 the flexible shafts 36 and 38 will move in an arc of a circle, and the extra length of the shafting required is provided for by the telescopic coupling 65. A similar arrangement is provided for shaft 31, attached to the center of member 1, as that provided for shaft 37; also, a similar arrangement is provided for shafts 30 and 32 as is provided for shafts 36 and 38.

70 designates a casing inclosing this gearing, which is removably secured to the plate or deck 84 by the screws 99. The shaft 37 is operatively connected to the turret turning gear of the lower turret through the gear 85, and is so designed that the member 35, which is rigidly attached to said shaft, will respond to the movements of the turret and move in unison therewith.

109 and 100 designate turrets, the location of which I have heretofore described, and turret 109 will hereafter be designated as the lower turret, while turret 100 will be designated as the upper one.

The flexible shafts 36 and 38 are operatively connected to the respective gun elevating gear of each gun in the lower turret through the same method of gearing as stated for shaft 37, and said gearing is so designed that the members 13 and 14 will respond to the movements of the guns therein and move in unison therewith. It is obvious that the position of member 35, with the elongated members mounted thereon, will assume the same relative relation as the turret and the guns which they represent.

The shaft 31 is operatively connected to the turret turning gear of the upper turret similar to that of the lower turret, and is so designed that the member 1, which is rigidly attached to said shaft, will respond to the movements of the turret and move in unison therewith. The flexible shafts 30 and 32 are operatively connected to the respective gun elevating gear of each gun in the upper turret, and the gearing is so designed that the members 11 and 12 will respond to the movements of the guns therein and move in unison therewith. It is obvious, therefore, that the position of member 1, with the elongated members mounted thereon, will assume the same relation as the turret and the guns which they represent.

In Fig. 10 I have shown the probable desired arrangement of shafting in a diagrammatic manner in a two-turret structure in which the indicator is located in the after end of each turret, near the turret officer, and under his observation, and in which the shaft 55 designates the training or revolving shaft of the upper turret. This motion is transmitted by the shaft 78 to the shaft 31 of the indicator located therein, and by the shaft 77 to the same indicator shaft located in the lower turret. 56 and 57 designate independent gun elevating shafts, and are connected to the respective shafts 30 and 32 by the shafts 79 and 80. The motion is also transmitted to the respective shafts of the indicator located in the lower turret by the shafts 75 and 76. It is obvious that the member 1 of the indicator in each turret, with the elongated members representing guns mounted thereon, will respond to the movements of the upper turret and move in unison therewith. 58 designates the turning or training shaft of the lower turret, and is connected to the shaft 37 of the indicator located therein by the shaft 81. The same motion is also transmitted to the similar shaft of the indicator located in the upper turret by the shaft 72. 59 and 60 designate the independent shafts of the respective gun elevating gear, and are connected to the shafts 36 and 38 of the indicator located in the lower turret by the shafts 82 and 83. The same motions are transmitted to shafts 36 and 38 of the indicator located in the upper turret by the shafts 73 and 74. It is obvious that the member 35 of the indicator located in each turret, with the elongated members representing guns mounted thereon, will respond to the movements of the lower turret and move in unison therewith, and that the position of each turret and their respective guns will at all times be shown in true relation to each other. The top portion of the casing 51 is provided with the glass disks 54 (see Fig. 3) by which visual observation can be made at any time of the relative position of the turrets. 46 designates a source of electromotive force, and one side is connected to the insulated members 11 and 12 by the flexible leads 110 and 102. Intermediate of said source and the members 11 and 12, and in circuit therewith, are the electric bells 45 and 44. The other side of said source is connected to the insulated members 13 and 14 by the flexible connections 103 and 104. Intermediate of said source and the members 13 and 14, and in circuit therewith, are the electric bells 43 and 42. The bells 45 and 44 are located in the upper turret, near the turret officer, while the bells 43 and 42 are located in the lower turret, near the turret officer. These bells provide a supplementary audible indication, as an auxiliary to and in combination with the visual indication of the models or members 11 and 12, and 13 and 14. 47, 48, 49 and 50 designate insulated connections whereby the leads 110, 103, 102 and 104 are led through the casing 51.

In case the construction of the turrets is such that the turrets themselves would foul, as could occur in the arrangement shown in Fig. 14, a design of the movable members in the indicating device will be in accordance with Figs. 12 and 13, in which 53 designates the standard which supports the casing 51. 111 and 112 designate the respective elongated members or models representing guns, and are constructed and connected similar to those of 11 and 12, and are mounted on the movable member 113 in a similar manner. 114 in Fig. 14 designates a solid shaft supported by the bearing 64, and free to revolve therein, and connected by gearing similar to that of the shaft 37, to its respective turret motion. The member 113, which is similar to the members 1 and 35, is rigidly fixed to said shaft 114. 115 and 116 designate shafts operatively connected to their respective gun elevating gearing similar to shafts 36 and 38, and shaft 114 is operatively connected to its respective turret turning shaft. 117 designates a casing fixed to the movable member 113 by the screw 118, and is insulated therefrom by the insulation 119. 120 designates a lead wire from the casing 117, and it is led through the casing 51 in a manner similar to lead wire 110. It is obvious that the members 1 and 35 could be supported by a solid shaft similar to 114, and a casing similar to 117 could be provided on each. The said casing 117 is made of some conducting material and is proportioned to the respective turret as to the general structural dimensions.

If a structural condition exists where two turrets are mounted in the same plane as shown in Fig. 14, and one at an elevated plane, as shown in Fig. 10, the circuits actuated by the engagement of the members representing guns and turrets will be as shown in Fig. 11, in which 121 and 122 designate sources of electromotive force. 117, 126 and 127 designate the casings representing turrets. 120, 124 and 125 designate connecting leads. 128 and 129 designate connecting leads for the elongated members 112 and 111.

If the turret represented by casing 127 should foul with the gun represented by the member 13 in the adjacent turret a circuit would be established as follows: positive side of source of electromotive force 122, lead 125 to the bell, casing 127, gun 13, lead 103, to the bell, and thence to negative side of source 122.

If the turret represented by casing 126 fouls with the gun represented by the member 111 a circuit will be established as follows: positive side of source of electromotive force 121, lead 124 to bell, to casing 126, to member 111, to lead 129 and to bell and thence to negative side of said source 121.

If gun-fire represented by the member 11 fouls with the gun represented by the member 112 a circuit will be established as follows: positive source of electromotive force 122, to bell and lead 110, to member 11, to member 112, to lead 128 and to bell, thence to negative source of electromotive force 121, to positive side of said source, to negative side of said source 122, thus connecting the said two sources in series with the respective circuits. It will be understood that the bells as shown in Fig. 11 will be located in the respective turrets corresponding to the members representing guns.

Having thus described the various parts throughout the several views, all of which will be readily understood by those familiar with the art to which this invention relates, and upon the parts being properly proportioned, its mode of operation will be substantially as follows: It will be assumed that the turrets as shown in the drawings are trained dead ahead, reference being had to Figs. 1 and 10. The turret officer of the upper turret gives the order to train the guns to the starboard side. The shaft 55 revolves in a direction consistent to such movement, which motion will be imparted to shafts 78 and 77, which will in turn trans- mit said motion to the shafts 31 of the indicators or models located in each turret. The vessel to be fired on may be at short range and a depression of the guns may be necessary. This motion can be transmitted during the revolution of the turret, and if such is the case the shafts 56 and 57 will revolve and impart motion to shafts 79 and 80, which will in turn transmit the motion to shafts 30 and 32, causing the worm and the worm wheel to revolve, which will cause a corresponding elevation or depression of the members 11 and 12. As aforesaid, the gearing is so proportioned that the indicator members move in unison, and the position determined by the member 1 and the members mounted thereon will be in true relation with the turret and its guns. One of these guns may be trained on a vessel at a great distance, the other may be depressed to train on a vessel for a short distance; the motions being independent, the members 11 and 12 will move independently. There will be no appreciable lost motion between the moving members of the device and the corresponding instrument shafts connected therewith, but there may be some in the flexible shafting itself during transmission from the turret motions to the respective shafts. This may be made practically negligible by speeding up the flexible shafting at the driven end thereof, and correspondingly reducing the speed thereof at its transmitting end, simply by the use of gears of the proper ratio. Assume the guns to be in the upper turret trained to the port side, firing at a vessel at short range, in which case the guns will assume a probably horizontal position. In the meantime orders are given to train the lower turret to the same side at an elevation at which it was firing. The turret is immediately swung around at full speed and a condition will exist where the guns will foul, as shown in Fig. 3, causing disablement and probably irreparable damage. Both guns may be trained ahead, as shown in Fig. 1, and the order given to elevate the lower turret guns, in which case the upper turret guns will shoot off the muzzles of the lower; again, both guns may be trained to port, and if the lower turret guns are elevated there is danger of shooting off the muzzles of the upper turret guns. One or more of these conditions can take place in any of the 270 degrees of train of either turret.

The maximum danger length of gun-fire from the upper turret is designated by the reduced portion 15 of the member 11, which is similar for the member 12, and is determined by the intersection of a horizontal line representing gun-fire from the upper turret, and an arc whose radius is the length from the center of the lower turret to the end of the guns. It will be understood that these elongated members representing guns and gun-fire can be made as large in diameter as desirable in order to give sufficient warning before the guns or gun-fire really interfere. While the members representing guns may engage, the guns do not engage, nor is it desired that they should, and these members are made sufficiently large in diameter to determine these conditions.

17 and 18 designate gun-fire from guns 13 and 14, and the maximum length is determined by training both turrets their extreme travel to the same side and then swing the upper turret around until the gun-fire from the lower turret fouls the muzzle of the upper. Upon the engagement of any of the said members the springs attached thereto will readily yield and prevent possible bending of the members, and upon the disengagement thereof they will assume their original position.

From the foregoing description it is obvious that the danger zones will be readily observed by the turret officer, who may give orders to prevent danger, and the position of any turret will at all times be indicated in one or all turrets.

In a manner heretofore described an arrangement of two or more turrets can be accomplished, the lengths of the members representing guns and gun-fire and turret, depending upon the particular type of vessel, and thus accomplishing the heretofore first-mentioned object of my said invention. Assuming that the conditions exist as shown in Fig. 1, where the gun-fire from gun 11 fouls with the muzzle of gun 13, a circuit will be established from the positive side of the source of electromotive force through bell 45, lead 110, member 11, member 13, lead 103, bell 43 to the negative side of said source. This circuit being completed, the bells 45 and 43 will sound an alarm denoting danger and give sufficient warning to prevent danger; again, the turrets may be so trained that the gun represented by member 11 may foul with the gun represented by member 14, in which case bells 45 and 42 will sound an alarm; or, again, the gun-fire from gun represented by the member 17 may foul the gun represented by the member 12, in which case a circuit will be established as follows: positive source of electromotive force, bell 44, lead 102, member 12, member 13, lead 103, bell 43 to negative side. This will give sufficient warning that danger is apparent, which may be prevented by the action of the turret officer, thereby preventing possible self-destruction, and thus accomplish the heretofore mentioned second object of my said invention.

From the foregoing description it will be observed that I have devised a simple and efficient system that is positive in its action, but I do not wish to limit myself to the exact construction of the apparatus, as it is apparent that modifications can be made without departing from the spirit and intent of my invention.

I claim,—

1. A system to indicate interference of guns for turrets comprising, in combination with the turret-turning gear and the gun-elevating gearing, a plurality of revoluble members designating turrets, revoluble elongated metallic members having insulated sections and designating guns, said elongated members being also proportioned to the dimensions of the guns, each of said members being operatively connected respectively with the turret-turning gear and the gun-elevating gearing so as to move in synchronism with the respective turret and gun motions, and a supplemental signal system actuated upon the engagement of said elongated members.

2. A system to indicate interference of guns for turrets comprising, in combination with the turret and gun controlling mechanism, a plurality of revoluble members designating turrets, revoluble elongated metallic members having insulated sections and designating guns, said metallic members being proportioned to the dimensions of the guns, plus a predetermined length representing gun fire, the said members being operatively connected with the turret and gun controlling members, and a supplemental electrical signal system actuated by engagement of said elongated members.

3. A system to indicate interference of guns for turrets comprising, in combination with the turret-turning gear, a plurality of revoluble members designating turrets, revoluble elongated metallic members designating guns and having insulated sections, said members being operatively connected with their respective turret-turning gear, and an electrical signal system actuated upon the engagement of the said elongated members, substantially as described.

4. In a gun indicating device, the combination with the guns and gun platforms, of sectional insulated metallic members each responsive to the movement of the guns and gun platforms and proportioned to the guns and gun platforms, and electrical signaling circuits adapted to be completed upon a predetermined movement of said members, substantially as described.

In testimony whereof I hereunto affix my signature in the presence of two witnesses.

DAVID R. KNAPP.

Witnesses:
JAMES S. HAMILTON,
HOWARD E. CADE.

---

Copies of this patent may be obtained for five cents each, by addressing the "Commissioner of Patents, Washington, D. C."